United States Patent [19]
Hamada et al.

[11] Patent Number: 5,146,371
[45] Date of Patent: Sep. 8, 1992

[54] SYSTEM INCLUDING A DIGITAL AUDIO TAPE RECORDER OR EQUIVALENT DEVICE FOR RECORDING NON-AUDIO SIGNALS

[75] Inventors: Toshihiko Hamada, Kodaira; Keizo Ihara, Musashino; Masato Iijima, Tokyo, all of Japan

[73] Assignee: Teac Corporation, Tokyo, Japan

[21] Appl. No.: 684,439

[22] Filed: Apr. 11, 1991

Related U.S. Application Data

[63] Continuation of Ser. No. 273,349, Nov. 18, 1988, abandoned.

[30] Foreign Application Priority Data

Nov. 28, 1987 [JP] Japan .................................. 62-301080

[51] Int. Cl.$^5$ ............................................... G11B 5/09
[52] U.S. Cl. .................................................... 360/32
[58] Field of Search ........................................ 360/32

[56] References Cited

U.S. PATENT DOCUMENTS

4,670,796  6/1987  Kobayashi et al. ................. 360/32
4,775,897  10/1988  Umemoro et al. .................. 360/32

*Primary Examiner*—Vincent P. Canney
*Attorney, Agent, or Firm*—Woodcock Washburn Kurtz Mackiewicz & Norris

[57] ABSTRACT

A digital audio tape recorder is adapted for recording non-music signals such as, typically, those representative of measurements being made in real time by one or more instruments or meters, together with brief vocal commentary on the measurements and/or with the date and time at which the measurements are made. If the measurements of two instruments or meters are to be recorded simultaneously, the two measurements signals as well as the vocal commentary signal are first digitized. A multiplexing circuit combines the first measurements signal and the commentary signal into a first series of composite data words, and the second measurements signal and a digital time signal into a second series of composite data words. The bits of each composite data word are apportioned between the first measurements signal and the commentary signal, and between the second measurements signal and the time signal, according to their expected relative amounts to be recorded. The two series of composite data words are transmitted by time division multiplexing to the record/reproduce circuit of the digital audio tape recorder, for interleaved recording on the tape just like stereophonic audio signals. Provisions may be made for reproduction of the non-music signals recorded.

2 Claims, 6 Drawing Sheets

STATUS OF MULTIPLEXER CONTROL INPUTS AND
CORRESPONDING CHOICE OF DATA

| Channel Control Signal | 15th Bit Control Signal | 16th Bit Control Signal | Data Chosen |
|---|---|---|---|
| High | Low | Low | Measurements (left channel) |
| Low | Low | Low | Measurements (right channel) |
| High | Low | High | Commentary (left channel) |
| Low | Low | High | Data & Time (right channel) |
| High | High | Low | Frame Start (left channel) |
| Low | High | Low | Optional Data (right channel) |

SYSTEM INCLUDING A DIGITAL AUDIO TAPE RECORDER OR EQUIVALENT DEVICE FOR RECORDING NON-AUDIO SIGNALS

This is a continuation of application Ser. No. 273,349, filed Nov. 18, 1988 now abandoned.

BACKGROUND OF THE INVENTION

Our invention relates generally to the art of magnetic tape recording, and particularly to an apparatus including a digital audio tape (DAT) deck or the like for recording non-audio (i.e. non-music) data signals on the tape in accordance with the standardized recording format of the recorder. The non-audio data signals to be recorded may, for example, be those representative of the measurements being made in real time by one or more instruments or meters, accompanied by brief vocal commentary on the measurements and/or the date and time at which the measurements are made. As the measuring instruments or meters capable of use with the recording system of our invention, we envisage those used in such diversified fields as, for instance, space technology, oceanography, medicine, automotive engineering, shipbuilding, architechture, and civil engineering.

Since an experimental model of DAT deck with a rotary head assembly (R-DAT deck) was completed by Sony Corp. in 1982 on the basis of the technology amassed from video tape recorders, the R-DAT decks have undergone numerous improvements and refinements. U.S. Pat. No. 4,549,230 to Odaka and U.S. Pat. No. 4,704,640 to Okamoto et al. reflect examples of such improvements and refinements in the art.

Today, as far as we know, the R-DAT decks seem to have won definitely greater acceptance among the digital audio specialists than DAT decks of the stationary head variety (S-DAT decks). The R-DAT and S-DAT decks are akin in that they are intended for use with DATs housed in very compact cassettes (standard size 73 mm by 54 by 10.5) that may be loaded in and unloaded from the decks, just as the conventional analog audio tape cassettes are in and from the associated decks.

The rotary head assembly of the R-DAT deck comprises two magnetic heads mounted to a rotary drum for scanning a multiplicity of slanting record tracks arranged in close side by side relation on the DAT. Each record track comprises five separate zones consisting of: (1) a central zone for the storage of 16 bits audio data by pulse code modulation (PCM); (2) a pair of subcode (SUB) zones disposed adjacent both ends of the track for the storage of program numbers, time codes, etc.; and (3) a pair of automatic track finding (ATF) zones one between the central PCM zone and each SUB zone.

Although the R-DAT decks are designed for, and indeed are capable of, very high quality recording and playback of music, we have noticed their adaptability for the accurate recording and reproduction of non-music data such as measurements made by a variety of instruments or meters used in the above enumerated fields. The R-DAT decks available today are very compact and inexpensive in construction, besides being highly reliable as data storage and retrieval apparatus.

There is one feature of the R-DAT deck that must enter into consideration in its adaptation for the storage and retrieval of non-music data. That is that the R-DAT deck is stereophonic. It might be contemplated to record the measurements data on, say, the left channel portions of the PCM zones of the record tracks, and complementary data such as vocal commentary on the right channel portions of the PCM zones. This scheme is not realistic, however, because the amount of the commentary data to be recorded will usually be so much less than that of the measurements data. Most of the track portions assinged to the complementary data would remain blank. Therefore, if all the available record tracks of the DAT were equally divided for the storage of the primary data and the complementary data, the complete storage capacity of the tape itself would not be fully utilized for the storage of the primary data.

SUMMARY OF THE INVENTION

We have hereby invented how to record two or more different non-audio data signals on DAT or like digital storage media to their full capacities in the face of a difference in the expected relative volumes of the signals to be recorded.

Briefly, our invention may be summarized as a digital recording system for use with a magnetic tape assembly including a magnetic tape, comprising a first input terminal for inputting a primary data signal of analog form, and a second input terminal for inputting a complementary data signal of analog form having a complemental relation to the primary data signal. A first analog to digital converter is coupled to the first input terminal for translating the primary data signal from analog to digital form. A second analog to digital converter is coupled to the second input terminal for translating the complementary data signal from analog to digital form. Also included is a multiplexing circuit coupled to the first and second analog to digital converters for combining the digital primary and complementary data signals into a series of composite data words each having a predetermined number of bits. The bits of each composite data word are apportioned between the primary and complementary data signals according to the expected relative amounts of the primary and complementary data signals to be recorded. A recording circuit is connected between the multiplexing circuit and a magnetic head assembly for causing the latter to record the series of composite data words on the magnetic tape in accordance with a prescribed format.

Of the above recited components of the digital recording system, the recording circuit and the magnetic head assembly can be the standard components of the prior art R-DAT deck. If each word to be recorded is of 16 bits, as is the case with the R-DAT deck, then 14 bits may be assigned to the primary data signal, and one bit to the complementary data signal. With the primary and complementary data signals so compounded into the composite data words, these words can be recorded on, and retrieved from, the magnetic tape just like audio data words. It will also be appreciated that the compounding of the primary and complementary data signals into the composite data words makes it possible to make full use of the data storage capacity of the tape for recording the two signals at a desired ratio.

We will herein disclose our invention as adapted for recording, by a stereophonic R-DAT recorder, two analog primary signals representative of measurements being made in real time by different instruments, and two analog complementary signals representative of brief vocal commentary on the measurements and of the date and time at which the measurements are made.

After the digitization of the primary and complementary signals, the multiplexing circuit combines the first measurements signal and the commentary signal into a first series of composite data words, and combines the second measurements signal and the date and time signal into a second series of composite data words. The bits of each composite data word are apportioned between the first measurements signal and the commentary signal, and between the second measurements signal and the date and time signal, according to their expected relative amounts to be recorded. The two series of composite data words can then be recorded on and reproduced from the DAT just like the two stereophonic channels of audio data words. No substantial alteration of the existing parts of the R-DAT recorder is required.

In recording vocal commentary or explanation of the primary data signal or signals as a complementary data signal, we recommend the use of a known delta modulator for digitizing the analog commentary signal into a serial one bit signal. Only one bit of each composite data word of the noted first series may then be assigned to the commentary signal. As an additional advantage, the commentary signal can be recorded throughout the run of the measurements being made and recorded.

The above and other features and advantages of our invention and the manner of realizing them will become more apparent, and the invention itself will best be understood, from a study of the following description and appended claims, with reference had to the attached drawings showing the preferred embodiment of our invention.

DESCRIPTION OF THE PREFERRED EMBODIMENT

Figure 1:
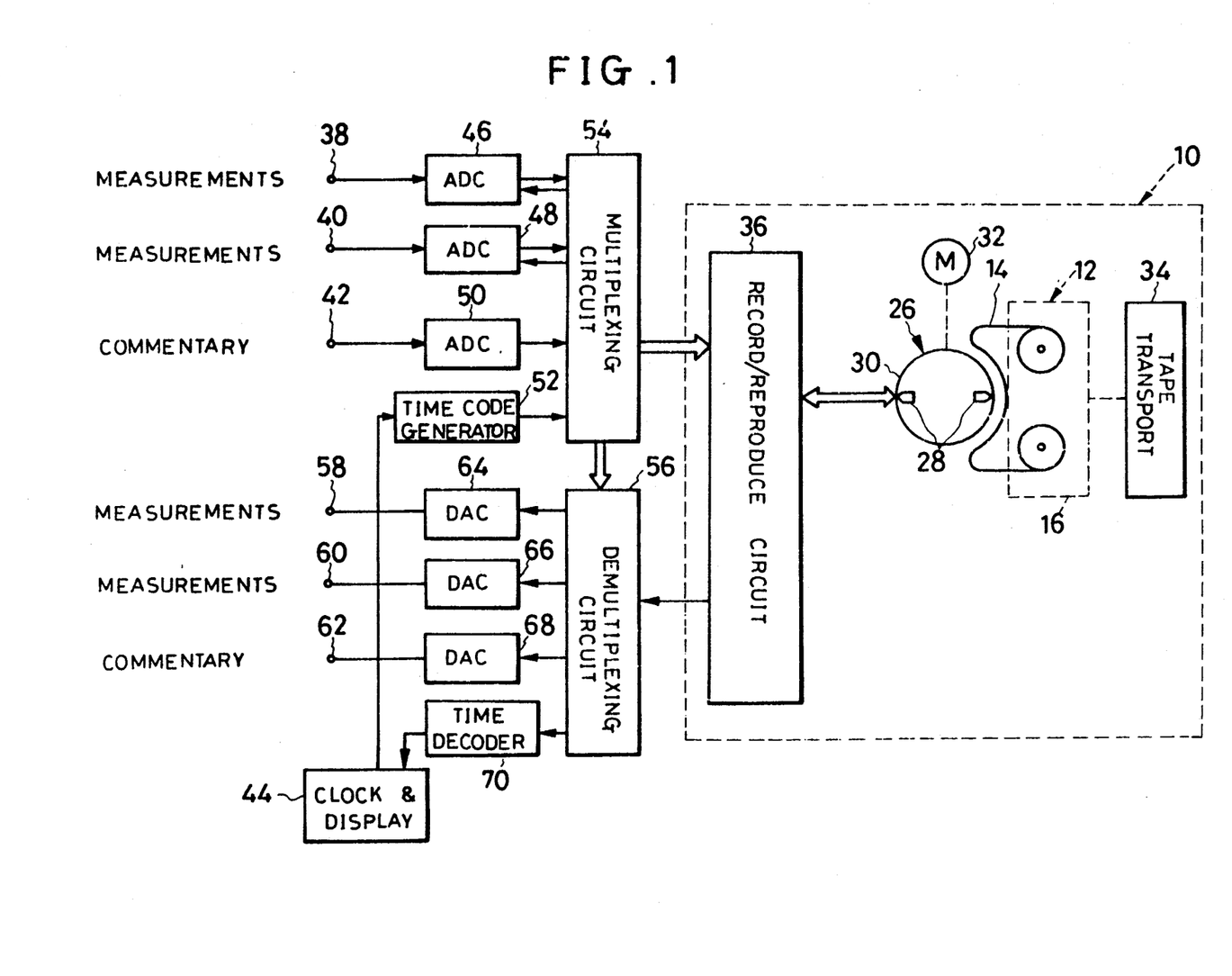
FIG. 1 is a block diagram of a preferred form of the digital recording system of our invention, the recording system being herein shown comprising an R-DAT deck for recording and reproducing measurements being made by two instruments, not shown, together with brief vocal commentary on the measurements and the date and time at which the measurements are made.

We will now describe our invention in detail as adapted for the real time recording and reproduction of measurements being made by two separate instruments, together with brief vocal commentary on the measurements and with the date and time at which the measurements are being made, on and from DAT. Shown enclosed in the dashed outline and generally designated 10 in FIG. 1 is an R-DAT recorder/reproducer of largely standard design for use with a standard replaceable DAT assembly or cassette 12. The DAT cassette 12 comprises a DAT 14 housed in a boxlike enclosure 16.

Figure 2:
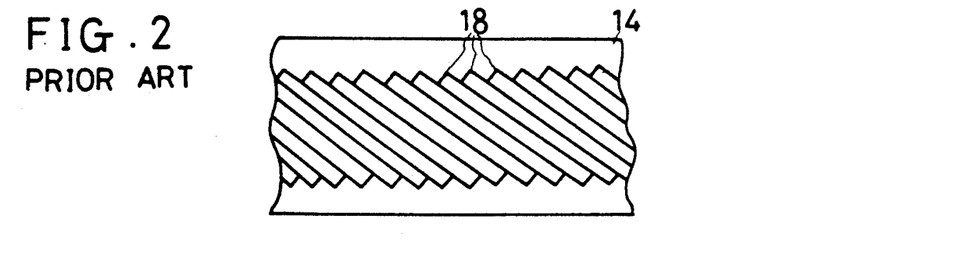
FIG. 2 is a fragmentary plan view of the digital audio tape for use with the R-DAT deck of FIG. 1, showing in particular the standard arrangement of slanting record tracks on the tape.

As illustrated fragmentarily in FIG. 2, the DAT 14 has a multiplicity of slanting record tracks 18 arranged in close side by side relationship to each other throughout its length.

Figure 3:
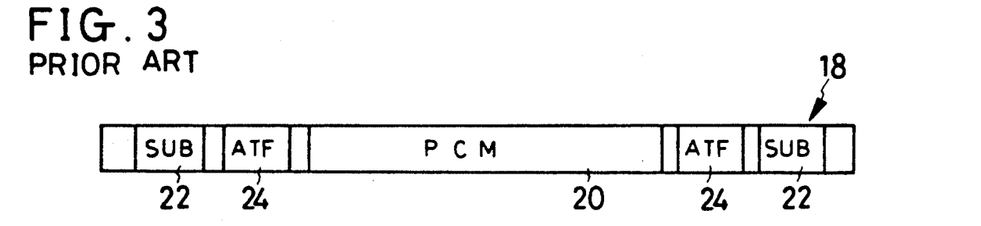
FIG. 3 is a diagrammatic representation of each record track of FIG. 2, showing in particular the arrangement of the five zones into which the track is conventionally divided.

FIG. 3 is an enlarged representation of each record track 18, showing the arrangement of the five different zones to which the track is conventionally divided. Arranged centrally of each record track 18 is a PCM zone 20 for the storage of primary data. A pair of subcode (SUB) zones 22 are disposed adjacent both ends of each track 18, and a pair of automatic track finding (ATF) zones 24 are provided one between the central PCM zone 20 and each SUB zone 22. The various non-audio or non-music data are to be stored on the PCM zones 20 of the slanting record tracks 18 in accordance with our invention.

With reference back to FIG. 1 a rotary head assembly 26 is disposed opposite the DAT cassette 12 loaded in position within the DAT deck 10. The rotary head assembly 26 comprises a pair of magnetic record/reproduce heads 28 mounted to a rotary drum 30. A drum motor 32 is drivingly coupled to the drum 30 for imparting rotation thereto. As a tape transport 34 moves the DAT 14 past the revolving head assembly 26, the pair of magnetic heads 28 thereon scan the DAT 14 along the multiplicity of slanting record tracks 18 thereon.

Another standard component of the DAT deck 10 is a record/reproduce circuit 36 connected to the pair of magnetic heads 28 for causing the latter to record and reproduce data on and from the tracks 18 on the DAT 14. We understand that the record/reproduce circuit 36 include provisions for formatting the data to be recorded on the DAT 14, and for deformatting the data recovered therefrom, in accordance with the prior art. We will later discuss how the measurements and other data are formatted before being recorded on the DAT 14.

To the R-DAT deck 10 of the above described construction we have added the following means for recording and reproducing non-audio data signals on and from the DAT 14. The non-audio data signals to be recorded and reproduced are, in this particular embodiment, two different measurements signals, a vocal commentary signal, and a date and time signal.

At 38 and 40 in FIG. 1 are shown first and second terminals to be connected to two different measuring instruments, not shown, capable of producing electric signals representing in real time the measurements being made thereby. Thus the first and second terminals 38 and 40 are for inputting first and second measurements signals. A third terminal 42 is for inputting a vocal commentary signal. A date and time signal is provided by a clock 44. The first, second and third input terminals 38, 40 and 42 are connected to first, second and third analog to digital converters (ADC) 46, 48 and 50, respectively. The clock 44 is connected to a date and time code generator 52 which translates the incoming date and time signal into form suitable for recording on the DAT.

The above listed three ADCs 46, 48 and 50 and date and time code generator 52 are all coupled to a multiplexing circuit 54 and thence to the record/reproduce circuit 36. The multiplexing circuit 54 combines the incoming first digital measurements signal and commentary signal into a series of 16 bits composite data words represented in FIG. 4A. Also the multiplexing circuit 54 combines the second digital measurements signal and date and time signal into another series of 16 bits composite data words depicted in FIG. 4B. The two series of composite data words are sent over a common path to the record/reproduce circuit 36 by time division multiplexing.

A demultiplexing circuit 56 is connected to the record/reproduce circuit 36 for reconstructing the various data signals from the composite data words that have been recovered from the DAT 14. The demultiplexing circuit 56 is connected to three output terminals 58, 60 and 62 via digital to analog converters (DAC) 64, 66 and 68, respectively. Additionally, the demultiplexing circuit 56 is connected to the clock 44 via a date and time decoder 70.

Figure 5:
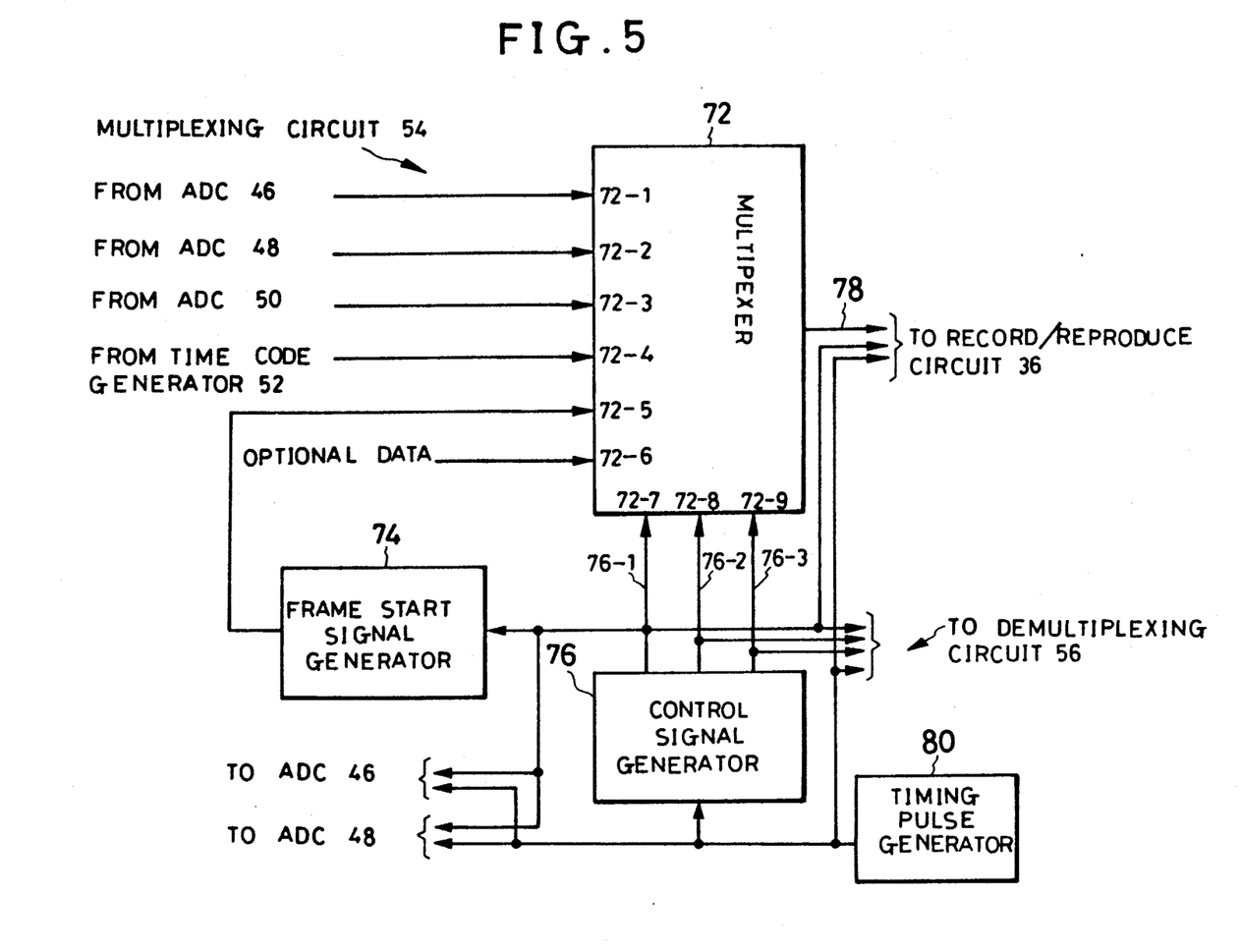
FIG. 5 is a block diagram showing in more detail the multiplexing circuit included in the FIG. 1 system.

We have illustrated the multiplexing circuit 54 in more detail in FIG. 5. The multiplexing circuit 54 includes a multiplexer 72 having six data inputs 72-1, 72-2, 72-3, 72-4, 72-5 and 72-6 and three control inputs 72-7, 72-8 and 72-9. The first data input 72-1 is coupled to the first ADC 46 for inputting the first digital measurements signal; the second data input 72-2 to the second ADC 48 for inputting the second digital measurements signal; the third data input 72-3 to the third ADC 50 for inputting the digital commentary signal; the fourth data input 72-4 to the time code generator 52 for inputting the coded date and time signal; the fifth data input 72-5 to a frame start data generator circuit 74 for inputting data representative of the start of each frame of the composite data words to be formed by the multiplexer 72; and the sixth data input 72-6 to an additional data source, not shown, for inputting additional data to be recorded at the manufacturer's or user's option.

The three control inputs 72-7, 72-8 and 72-9 of the multiplexer 72 are connected to a control signal generator circuit 76 via control lines 76-1, 76-2 and 76-3, respectively. The multiplexer 72 passes a different one of the six incoming data signals depending upon the status of its three control inputs, in order to produce the noted two series of composite data words and to serially deliver them by time division multiplexing over a single output line 78 leading to the record/reproduce circuit 36 of the R-DAT deck 10.

Figure 6:
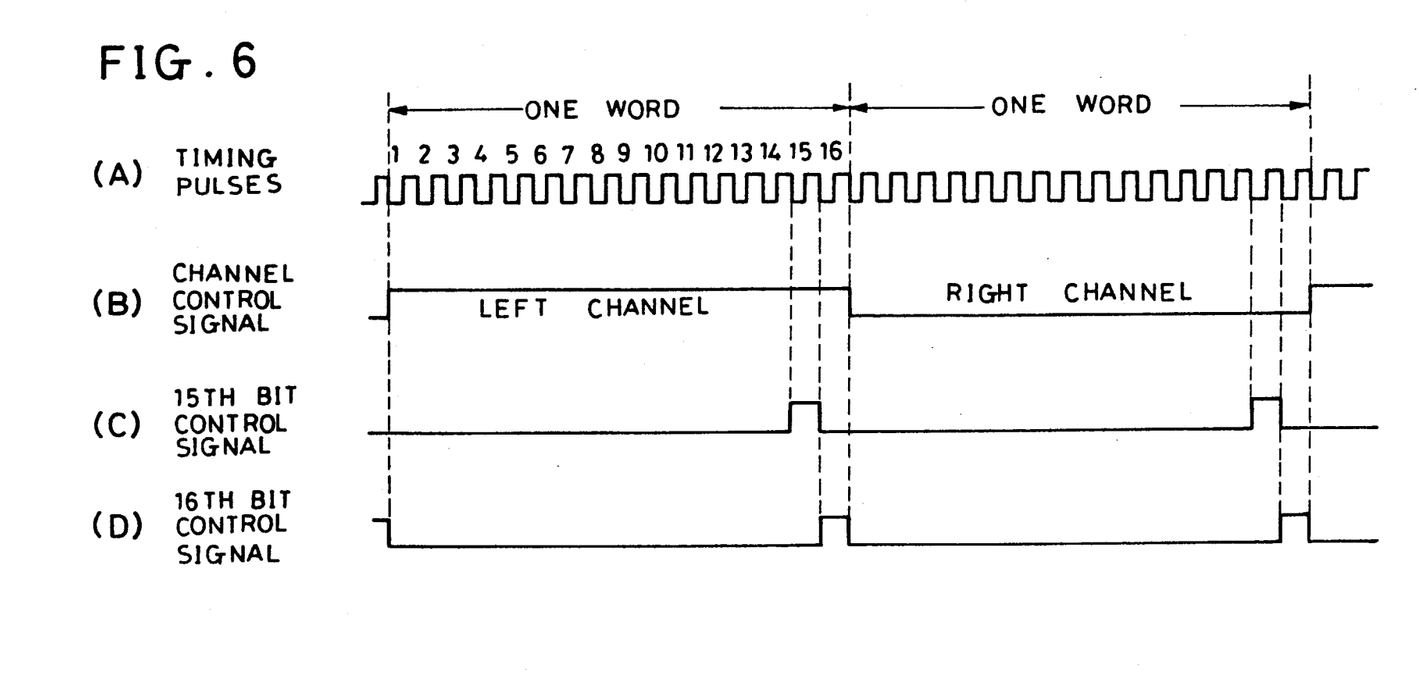
FIG. 6, consisting of (A)–(D), is a diagram of waveforms useful in explaining how the data signals are multiplexed by the FIG. 5 circuit.

A study of FIG. 6 will reveal how the control signal generator circuit 76 controls the multiplexer 72 by generating the three control signals applied to the multiplexer control inputs 72-7–72-9. At (A) in FIG. 6 is shown a series of timing pulses fed from a timing pulse generator 80 to the control signal generator circuit 76 to provide a time basis for the three control signals which are represented at (B), (C) and (D) in FIG. 6. It will be seen that every sixteen timing pulses represent the time length of each 16 bit composite data word of FIGS. 4A or 4B to be produced by the multiplexer 76.

In synchronism with the timing pulses fed from the generator 80, the control signal generator circuit 76 puts out over the first control line 76-1 a channel control signal of FIG. 6(B) in which a transition takes place with every sixteenth timing pulses. The high and low states of this channel control signal determine that the corresponding composite data words are to be directed into the left and right channels, respectively, of the R-DAT deck 10. The first control line 76-1 is coupled not only to the multiplexer 72 but also to the first 46 and second 48 ADCs shown in FIG. 1. The first ADC 46 serially puts out the words of the first digital measurements signal during the successive high states of the channel control signal. The second ADC 48 serially puts out the words of the second digital measurements signal during the successive low states of the channel control signal.

We understand that although the first and second digital measurements signals produced by the ADCs 46 and 48 are both of sixteen bits words, the two least significant bits of each word are cut off by the multiplexer 72. Therefore, in each composite data word formed by the multiplexer 72, only the remaining fourteen bits of each word of the measurements signals occupy the most to fourteenth significant bit positions.

Supplied over the second control line 76-2 is a fifteenth bit control signal shown in FIG. 6(C). This signal is high during the fifteenth period of every sixteen timing pulses, representing the fifteenth significant bit position of each composite data word. A sixteenth bit control signal of FIG. 6(D) is supplied over the third control line 76-3. This signal is high during the sixteenth period of every sixteen timing pulses, representing the sixteenth significant bit position of each composite data word.

Figure 7:
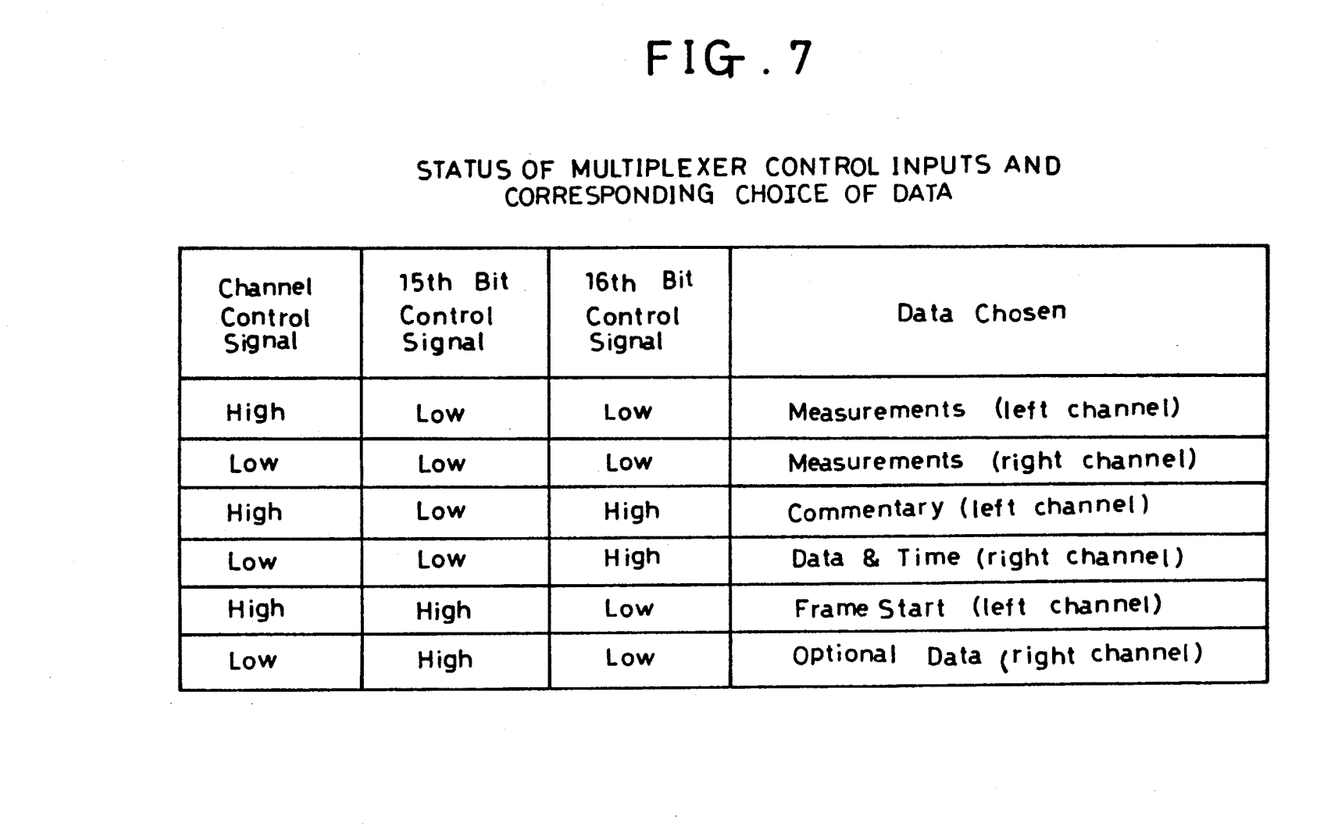
FIG. 7 is a table which also is useful in explaining how the data signals are multiplexed by the FIG. 5 circuit.

FIG. 7 is a table listing the status of the three multiplexer control inputs 72-7 - 72-9 (i.e. the channel control signal, the 15th bit control signal, and the 16th bit control signal) and the corresponding choice made by the multiplexer 72 among the six possible digital data signals being supplied to the multiplexer data inputs 72-1 - 72-6. We will refer back to this table in the course of the subsequent description of operation.

It is to be understood that we have shown the control signal generator circuit 76 and the timing pulse generator 80 as parts of the multiplexing circuit 54 purely for the convenience of disclosure. In fact they are shared by the record/reproduce circuit 36, ADCs 46 and 48, multiplexing circuit 54, and demultiplexing circuit 56.

Figure 8:
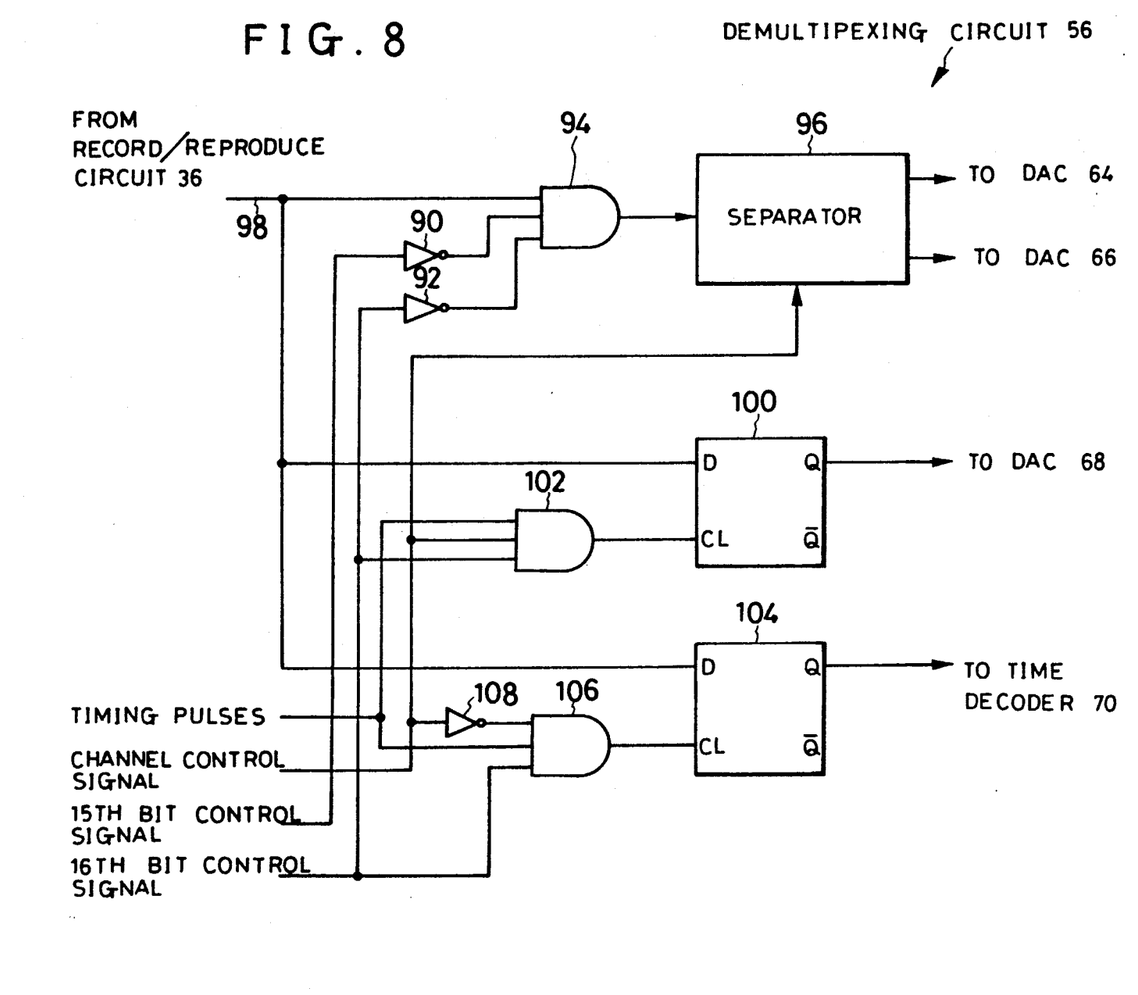
FIG. 8 is a block diagram showing in more detail the demultiplexing circuit included in the FIG. 1 system.

Reference may be had to FIG. 8 for the detailed construction of the demultiplexing circuit 56. Just as the two channels of composite data words to be recorded are transmitted by time division multiplexing from multiplexing circuit 54 to record/reproduce circuit 36, so the recovered composite data words of both channels are similarly fed over a common path from record/reproduce circuit 36 to demultiplexing circuit 56. The demultiplexing circuit 56 serves the purpose of resolving the recovered composite data words into the first and second measurements signals, commentary signal, and date and time signal.

In order to derive the two measurements signals from the two series of recovered composite data words, the demultiplexing circuit 56 comprises two NOT circuits 90 and 92, a three input AND gate 94, and a separator circuit 96. The AND gate 94 has a first input coupled to the single output line 98 of the record/reproduce circuit 36, a second input to the 15th bit control line 76-2, FIG. 5, via the NOT circuit 90, and a third input to the 16th bit control line 76-3, FIG. 5, via the NOT circuit 92. It is thus seen that the AND gate 94 passes only the most to 14th significant bits of each recovered composite data word of both channels issuing from the record/reproduce circuit 36. The separator circuit 96 separates the output from the AND gate 94 into the first and second digital measurements signals for delivery to the first 64 and second 66 DACs, FIG. 1, respectively. The channel control line 76-1, FIG. 1, is connected to the separator circuit 96 in order to enable such separation of the measurements data.

Employed for deriving the commentary signal from the left channel of recovered composite data words are a D flip flop 100 and a three input AND gate 102. The flip flip 100 has a data input D coupled to the output line 98 of the record/reproduce circuit 36, and a clock input CL coupled to the AND gate 102. This AND gate has a first input coupled to the timing pulse generator 80, FIG. 5, a second input to the channel control line 76-1, FIG. 5, and a third input to the 16th bit control line 76-3, FIG. 5. Consequently, the AND gate 102 goes high only when the least significant bit of each left channel composite data word is being fed into the data input D of the flip flop 100. The least significant bit of each left channel composite data word is assigned to the commentary signal. Therefore, clocked by the high output from the AND gate 102, the flip flop 100 latches the commentary data from the successive left channel words. The noninverting output Q of the flip flop 100 is coupled to the third DAC 68 for the delivery of the digital commentary signal thereto.

The demultiplexing circuit 56 further comprises another D flip flop 104, a three input AND gate 106 and a NOT circuit 108 for deriving the date and time signal from the right channel of recovered composite data words. The flip flop 104 has a data input D coupled to the output line 98 of the record/reproduce circuit 36, and a clock input CL coupled to the AND gate 106. This AND gate 106 has a first input coupled to the channel control line 76-1, FIG. 5, via the NOT circuit 108, a second input to the timing pulse generator 80, FIG. 5, and a third input to the 16th bit control line 76-3, FIG. 5. Accordingly, the AND gate 106 goes high only when the least significant bit of each right channel composite data word is being fed into the data input D of the flip flop 104, enabling the same to latch the date and time data from the successive right channel words. The noninverting output Q of the flip flop 100 is coupled to the time decoder 70 for the delivery of the recovered date and time signal thereto.

OPERATION

Although the operation of the FIG. 1 recording and reproducing system may be largely apparent from the foregoing, we will make further amplification in the following brief summary of such operation.

The first and second input terminals 38 and 40 may be connected to two desired measuring instruments, not shown, for recording in real time the measurements to be made thereby. The third input terminal 42 may be connected to a microphone circuit, also not shown. As the unshown instruments produce first and second analog signals representing the measurements being made, the ADCs 46 and 48 will digitize the first and second analog measurements signals by PCM and deliver the resulting first and second digital measurements signals to the multiplexing circuit 54.

The unshown microphone circuit connected to the third input terminal 42 is intended for the recording of, for example, the vocal annoucment of the start and stop of each run of measuring operation, together with brief commentary on the measurements. The third ADC 50 will digitize this analog commentary signal by PCM and deliver the resulting digital commentary signal to the multiplexing circuit 54.

We understand that the ADC 50 of this embodiment is a delta modulator of known construction which provides a one bit output signal indicative of whether each sample of the commentary signal is greater or smaller than the preceding sample. The delta modulator 50 serves to minimize the bit requirement of the commentary signal in each composite data word to be formed by the multiplexing circuit 54, as will become better understood as the description proceeds.

The clock 44 can also be of any known or suitable construction capable of producing signals indicative of the date (day, month and year) and time (the time of day, minutes and seconds). The date and time code generator 52 translates the date and time signals into digital date and time codes suitable for recording on the DAT 14 and deliver the coded date and time signal to the multiplexing circuit 54. Additionally, during reproduction, the clock 44 should be capable of visually displaying the date and time being read out from the DAT 14 together with the measurements signals and commentary signal.

Thus the multiplexing circuit 54 inputs all of the first digital measurements signal from the first ADC 46, the second digital measurements signal from the second ADC 48, the digital commentary signal from the third ADC 50, and the digital date and time signal from the code generator 52.

Figure 4A:
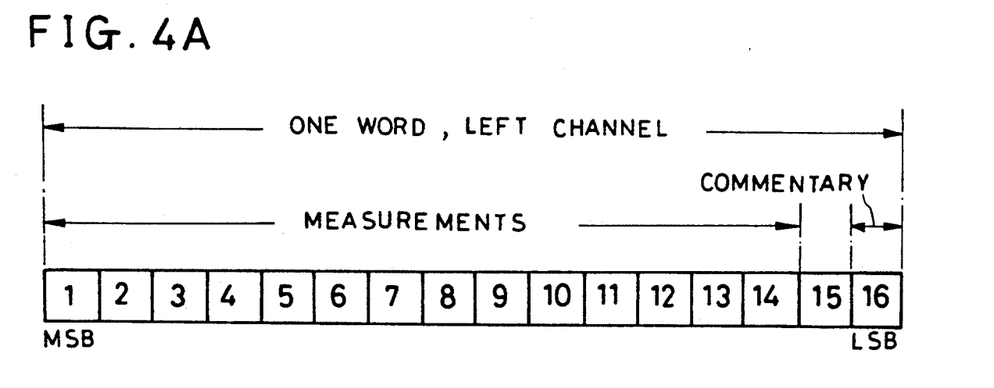
FIG. 4A is a diagram explanatory of how the bits of each of a first series of composite data words recorded by the FIG. 1 system are apportioned between the first measurements signal and the vocal commentary signal.

In this particular embodiment the multiplexing circuit 54 combines the first measurements signal and the commentary signal to produce a first series of composite data words, each represented in FIG. 4A, for recording on the left channel track portions of the DAT 14. Further the multiplexing circuit 54 combines the second measurements signal and the date and time signal to produce a second series of composite data words, each represented in FIG. 4B, for recording on the right channel track portions of the DAT 14. Still further the multiplexing circuit 54 alternately transmits the two series of composite data words to the record/reproduce circuit 36 of the R-DAT deck 10 by time division multiplexing.

Figure 4B:
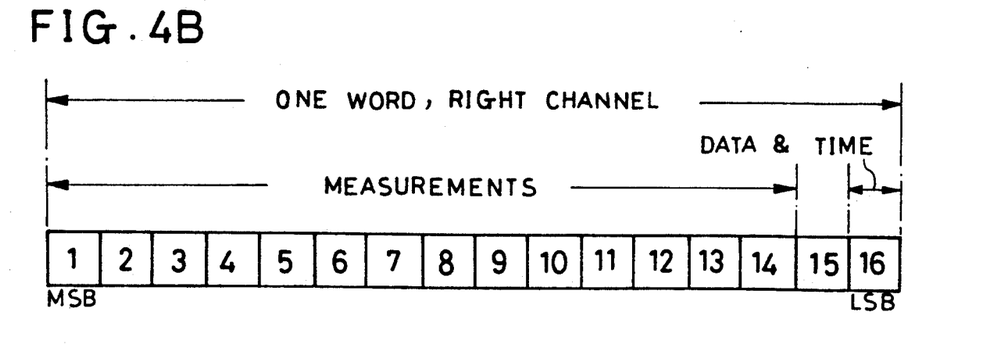
FIG. 4B is a diagram explanatory of how the bits of each of a second series of composite data words recorded by the FIG. 1 system are apportioned between the second measurements signal and the date and time signal.

As will be noted from FIGS. 4A and 4B, each composite data word has 16 bits. The more significant 14 bits, from the most significant bit (MSB) to the 14th significant bit, of each of the first series of composite data words are assigned to the first measurements signal, and the least significant bit (LSB) thereof is assigned to the commentary signal. The more significant 14 bits, from the MSB to the 14th significant bit, of each of the second series of composite data words are assigned to the second measurements signal, and the LSB thereof is assigned to the date and time signal.

As has been stated, the record/reproduce circuit 36 conventionally includes a formatter for recording, via the rotary head assembly 26, the two series of composite data words on the PCM zones 20 of the DAT tracks 18 in accordance with the standard DAT format. The standard R-DAT format involves the interleaving of the first and second series (channels) of composite data words. The interleaved recording of both channels of words requires the grouping of every 1440 composite data words of the first series (left channel) into one frame, and every 1440 composite data words of the second series (right channel) into one frame. The odd numbered 720 words and even numbered 720 words of each left channel frame, and the odd numbered 720 words and even numbered 720 words of each right channel frame, are interleaved on the PCM zones 20 of the record tracks 18. Incidentally, the composite data words will be recorded at a rate of 96,000 words per second in accordance with the prior art.

With the above explained recording format of the R-DAT deck 10 in mind, we will now proceed to a more detailed discussion of how the multiplexing circuit 54 produces a row of alternating first and second series of composite data words of FIGS. 4A and 4B for time division multiplex transmission to the record/reproduce circuit 36.

As will be noted by referring to FIG. 5 again, the multiplexer 72 of the multiplexing circuit 54 is equipped to pass any of the six different data signals, applied to its data inputs 72-1–72-6, as dictated by the status of the three control signals impressed to its control inputs 72-7–72-9. An inspection of the table of FIG. 7, taken together with the waveform diagram of FIG. 6, will make clear the various possible combinations of the high and low states of the three control signals and the corresponding choices made by the multiplexer 72 among the various data signals supplied thereto.

First, when the channel control signal is high whereas the 15 bit control signal and 16th bit control signal are both low, the first ADC 46 will put out a 16 bits word of the first measurements signal in response to the high state of the channel control signal. The multiplexer 72 will cut off the fifteenth and least significant bits of the incoming word and put out the remaining fourteen bits.

Then, as the 15th bit control signal goes high as at (C) in FIG. 6, with the channel control signal still high and the 16th bit control signal still low, the multiplexer 72 will choose the output from frame start signal generator circuit 74 as the fifteenth significant bit following the fourteen bits of the first measurements signal. In FIG. 4A, however, the fifteenth significant bit of the left channel word is shown as a blank. This is because this bit position is for writing the digit "1" on every 1440th composite data word of the left channel in order to indicate the start of a frame.

Then, as the 16th bit control signal subsequently goes high as at (D) in FIG. 6, with the channel control signal still high and the 15th bit control signal made low, the multiplexer 72 will choose the 1 bit commentary signal from the third ADC 50 which takes the form of a delta modulator in this embodiment.

There is thus completed one 16 bits composite data word of the left channel shown in FIG. 4A. The most to fourteenth significant bits of the word are assigned to the first measurements signal, and the least significant bit to the commentary signal.

When the channel control signal subsequently goes low as at (B) in FIG. 6, with the 15 bit control signal held low and the 16th bit control signal also made low, the second ADC 48 will put out a 16 bits word of the second measurements signal in response to the low state of the channel control signal. The multiplexer 72 will cut off the fifteenth and least significant bits of the incoming word and put out the remaining fourteen bits.

Then, as the 15th bit control signal goes high as at (C) in FIG. 6, with both the channel control signal and the 16th bit control still low, the multiplexer 72 will choose the optional data as the fifteenth significant bit following the fourteen bits of the second measurements signal. In FIG. 4B, however, the fifteenth significant bit of the right channel word is shown as a blank. As required, the digit "1" may be written on the fifteenth significant bit of every 1440th word of the right channel, too, in order to indicate the start of a right channel frame.

Then, as the 16th bit control signal subsequently goes high as at (D) in FIG. 6, with the channel control signal still low and the 15th bit control signal made low, the multiplexer 72 will choose the date and time signal from the time code generator 64.

Thus the multiplexer 72 forms one 16 bits composite data word of the right channel shown in FIG. 4B. The most to fourteenth significant bits of the word are assigned to the second measurements signal, and the least significant bit to the date and time signal.

The multiplexing circuit 54 will repeat the same cycle of operation thereafter, alternately producing the left and right channels of composite data words and delivering them by time division multiplexing to the record/reproduce circuit 36. This circuit 36 will then cause the rotary head assembly 26 to record the composite data words on the DAT 14, interleaving them on the record tracks in the manner set forth previously.

It is to be noted that the interleaving of the two series or channels of composite data words is not an inherent feature of our invention but is an intrinsic performance characteristic of the standard R-DAT deck. Our invention features, instead, the fact that the first and second measurements signals, the commentary signal and the date and time signal are combined as above explained into the two series of composite data words which, on time division multiplex transmission from the multiplexing circuit 54 to the record/reproduce circuit 36 of the R-DAT deck of standard design, can be recorded on the DAT 14 just as the two channels of stereophonic audio signals are. It will also be appreciated that the 16 bits of each left channel word are appropriately apportioned between the first measurements signal and the commentary signal, and the 16 bits of each right channel word between the second measurements signal and the date and time signal, in accordance with the expected relative volumes of the primary and complementary signals to be recorded.

We have stated that the first and second ADCs 46 and 48 translate the first and second measurements signals into 16 bits words, and that the multiplexer 72 cuts off the two least significant bits of each incoming word, alloting the remaining 14 bits of each word to the most to 14th significant bits of one composite data word. Alternatively, however, the ADCs 46 and 48 may be of the type converting the measurements signals into 14 bits words, and all the bits of each word may be assigned to the more significant 14 bits of each composite data word. As another possible alternative the measurements signals may be translated into words of less than 14 bits, and a required number of 0's may be added to the less significant bit positions to provide the 14 bits words.

For reproduction, both channels of composite data words will be recovered from the DAT 14 and fed back by time division multiplexing from the record/reproduce circuit 36 to the demultiplexing circuit 56. As has been explained with reference to FIG. 8, the demultiplexing circuit 56 will resolve the two incoming series of composite data words into the first and second measurements signals, the commentary signal and the date and time signal. The first and second measurements signals will be translated from digital to analog form by the first and second DACs 64 and 66, and the analog measurements signals will be put out through the first and second output terminals 58 and 60, respectively. The commentary signal of one bit serial form, transferred at a rate of 48 kilobits per second, will be converted from digital to analog form by the third DAC 68, and the analog commentary signal will be delivered to the third output terminal 62. In this embodiment the third DAC 68 is a delta demodulator corresponding to the delta modulating ADC 50. The date and time signal will be decoded by the decoder 70 into the signals suitable for display of the reproduced date and time by the clock 44.

Although we have shown and described our invention in terms of but one embodiment thereof, we recognize, of course, that our invention could be embodied in other forms within the broad teaching hereof. For instance, the fifteenth significant bit of each right channel word could be used for recording the commentary signal, instead of being left as a blank as in the illustrated embodiment. Also, only one, or more than two, channels of primary data could be recorded by interleaving, together with only one, or more than two, channels of complementary data. Additional modifications or alterations of our invention may be resorted to without departing from the scope of the appended claims.

What we claim is:

1. A digital recording system for use with a magnetic tape assembly including a magnetic tape, comprising:

a magnetic head assembly for data transfer with the magnetic tape of the magnetic tape assembly;

a tape transport for moving the magnetic tape past the magnetic head assembly;

a first input terminal for inputting a primary data signal of analog form representative of measurements;

a second input terminal for inputting a complementary data signal of analog form representative of vocal commentary on the measurements;

a first analog to digital converter coupled to the first input terminal for translating the primary data signal from analog to digital form;

a second analog to digital converter coupled to the second input terminal for translating the complementary data signal from analog to digital form;

multiplexing circuit means coupled to the first and second analog to digital converters for combining the digital primary and complementary data signals into a series of composite data words each having a series of a predetermined number of bits, the bits of each composite data word being assigned to the primary and complementary data signals at a ratio predetermined by the expected relative amounts of the primary and complementary data signals to be recorded, the primary data signal having a predetermined number of bits greater than the number of bits of the complementary data signal; and a recording circuit connected between the multiplexing circuit and the magnetic head assembly for causing the latter to record the composite data words on the magnetic tape in accordance with a prescribed format;

wherein the multiplexing circuit means comprises:

(a) a multiplexer having at least two data inputs coupled one to each analog to digital converter for inputting the digital primary and complementary data signals, and an output coupled to the recording circuit for supplying the series of composite data words thereto; and (b) a control signal generator circuit coupled to the multiplexer for supplying thereto a set of control signals, the multiplexer being responsive to the status of the control signals for selectively passing the digital primary and complementary data signals therethrough so as to form the series of composite data words.

2. In combination with a digital audio tape recorder of the type having a head assembly for data transfer with a digital audio tape, and a record/reproduce circuit connected to the head assembly, a system for recording non-audio signals on the digital audio tape, comprising:

a first input terminal for inputting a first analog measurements signal representative of measurements being made in real time;

a second input terminal for inputting a second analog measurements signal representative of measurements being made in real time;

a third input terminal for inputting an analog commentary signal representative of vocal commentary on the measurements;

a first analog to digital converter coupled to the first input terminal for translating the first measurements signal from analog to digital form;

a second analog to digital converter coupled to the second input terminal for translating the second measurements signal from analog to digital form;

a third analog to digital converter coupled to the third input terminal for translating the commentary signal from analog to digital form;

clock means for providing a digital time signal representative of time; and multiplexing circuit means coupled to the first and third analog to digital converters for combining the first digital measurements signal and the digital commentary signal into a first series of composite data words each having a series of a predetermined number of bits, the bits of each composite data word being assigned to the first measurements signal and the commentary signal at a ratio predetermined by the expected relative amounts of the first measurements signal and the commentary signal to be recorded, the multiplexing circuit means being also coupled to both the second analog to digital converter and the clock means for combining the second digital measurements signal and the digital time signal into a second series of composite data words each having a series of a predetermined number of bits, the bits of each composite data word of the second series being assigned to the second measurements signal and the time signal at a ratio predetermined by the expected relative amounts of the second measurements signal and the time signal to be recorded, the first and second digital measurements signals having a predetermined number of bits greater than the number of bits of the digital commentary and digital time signals;

the record/reproduce circuit of the digital audio tape recorder being connected to the multiplexing circuit means for causing the head assembly to record the first and second series of composite data words on the digital audio tape in accordance with a prescribed format; and the multiplexing circuit means comprising:

(a) a multiplexer having a plurality of data inputs coupled one to each of the first to third analog to digital converters and the clock means for inputting the first and second measurements signals and the commentary signal and the time signal, and a data output coupled to the record/reproduce circuit for time division multiplex transmission thereto of the composite data words of the first and second series; and (b) a control signal generator circuit coupled to the multiplexer for supplying thereto a set of control signals, the multiplexer being responsive to the status of the control signals for selectively passing the first and second measurements signals and the commentary signal and the time signal so as to form an alternating row of the composite data words of the first and second series.

* * * * *